United States Statutory Invention Registration [19]

[11] Reg. Number: H671

Cho et al. [43] Published: Sep. 5, 1989

[54] PROCESS FOR FORMING THERMOPLASTIC PARTS ESPECIALLY LARGE STRUCTURAL PARTS OF HIGH VISCOSITY RESIN REPLICATING MOLD SURFACE

[76] Inventors: Marcia J. Cho, 61 Hunters Run, Newtown Square, Pa. 19073; Christopher J. LaTulippe, 2203 St. Francis St., Wilmington, Del. 19808; Robert A. Marin, 108 Sonant Dr., Newark, Del. 19713

[21] Appl. No.: 82,315

[22] Filed: Aug. 6, 1987

[51] Int. Cl.[4] ..... B29C 35/02

[52] U.S. Cl. ..... 264/521; 264/544; 264/522; 264/535; 264/322; 264/327; 425/547

[58] Field of Search ..... 264/521, 522, 523, 528, 264/535, 544, 322

[56] References Cited

U.S. PATENT DOCUMENTS

| | | | |
|---|---|---|---|
| 3,655,848 | 4/1972 | Young et al. | 264/521 |
| 3,880,973 | 4/1975 | Yoshikawa et al. | 264/521 |
| 4,512,948 | 4/1985 | Jabarin | 264/521 |

FOREIGN PATENT DOCUMENTS

| | | | |
|---|---|---|---|
| 2540930 | 4/1976 | Fed. Rep. of Germany . | |
| 1339479 | 11/1962 | France | 264/521 |
| 52-77170 | 6/1977 | Japan | 264/521 |
| 1051974 | 12/1966 | United Kingdom | 264/521 |

*Primary Examiner*—John F. Terapane

*Assistant Examiner*—Daniel S. Metzmaier

[57] ABSTRACT

Thermoplastic parts are formed by a process that produces at least one surface that is a direct replication of the mold surface without secondary operations, e.g., a "Class A" surface. The process is particularly suitable for the production of large parts such as automobile panels, refrigerator panels and the like especially those employing a high-viscosity resin and particularly those parts made by blow-molding. The process comprises pressing at a selected pressure a plastic preform heated above the glass transition temperature (Tg) against a suitably smooth or detailed mold surface held at a temperature below the Tg of the resin; raising, preferably rapidly, the mold to a temperature above Tg for the time necessary to raise above Tg a depth of resin sufficient to remove surface imperfections, die lines, and pores, and fill voids, and substantially embed included matter; and rapidly cooling the mold until the molded part is below Tg when pressure may be released and the mold opened.

10 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR FORMING THERMOPLASTIC PARTS ESPECIALLY LARGE STRUCTURAL PARTS OF HIGH VISCOSITY RESIN REPLICATING MOLD SURFACE

BACKGROUND

Thermoplastic polymer parts find application in many industries of which the automotive industry is one. Such parts may be formed by processes such as injection molding, thermoforming, and blow-molding among others. Whatever the process, if the part is to be painted, the surface must comply to exacting standards as painting may not mask surface defects or may exaggerate them.

Such a surface is known in the automotive industry as a "Class A surface" although strictly speaking a surface is rated Class A only after painting.

A surface sufficiently smooth of contour, uniform of texture, and free from pits, pores, die lines, weld and flow marks, and inclusions to permit painting a Class A surface can be prepared by operations such as sanding and polishing subsequent to molding. Economics, however, dictates molding a surface of sufficient quality that it may be painted without secondary operations except the removal of flash.

Large parts, such as panels, are difficult to form with a Class A finish or any other surface replicating the negative image on a mold face by injection molding particularly since the structural requirements of large parts are best satisfied by resins which exhibit high melt viscosity. These parts are difficult or impossible to form by that method due to the combination of high viscosity and the need for long thin injection passages to avoid weld lines. This in turn leads to high injection pressures, enormous mold clamping forces and massive molds. Viscosity modifiers help to a degree but introduce other problems.

These large parts then are either thermoformed (pressed out of a preform, a heated sheet) by the vacuum/pressure or the matched mold method or blow-molded (expanded from a preform, usually a tubular parison) by the injection blow molding method in which the hot parison is formed just prior to expansion. These two procedures also have problems. In these processes where, as is customary, a hot sheet is pressed, or a hot parison is expanded into a mold, air may be trapped between the soft surace and the mold, causing an imperfection. If the mold is hot, a good part can be made if the part is small. If the part is large, the mold surface is not replicated and/or surfaces may be thermally degraded where the air pockets prevent cooling. Installing strategically located vents may remove these air pockets, but the vents themselves are prone to mark the final part. Using a cold mold tends to yield parts that have the aforementioned surface defects particularly weld lines, die lines, pits and inclusions.

It, thus, is desirable to form thermoplastic parts which have at least one critical surface that replicates the mold surface without imperfections and are not subject to such defects as voids, pores, die lines, weld lines, inclusions and the like.

SUMMARY

According to the present invention, there is now provided an improved process in which a thermoplastic resin preform, heated well above the glass transition temperature (Tg) of the resin, is pressed at a selected pressure into a mold heated only to a temperature below Tg, mold temperature is raised above Tg for a time sufficient to heat the surface of the formed part to a depth below the contacting surface sufficient to remove surface defects and embed any inclusions. The mold and part are then cooled below Tg and the pressure released and the part demolded, i.e., removed from the mold. The part replicates the mold surface even if highly polished. The need for vents especially in critical areas is minimized or eliminated. Such parts are useful as automobile panels, refrigerator panels or furniture components or the like where an extensive structural surface must have a controlled surface finish for direct utilization or for subsequent painting, e.g., a Class A finish.

DESCRIPTION OF DRAWINGS

Figure 1:
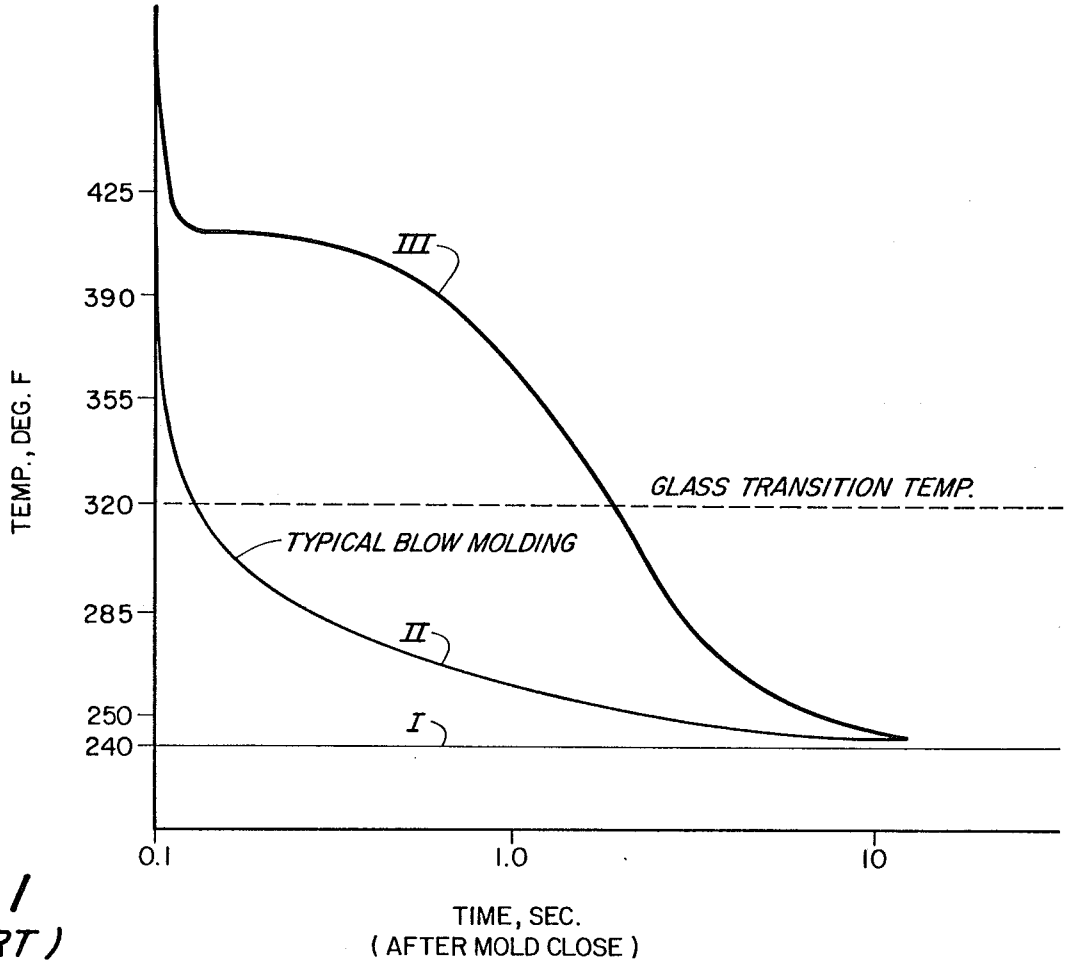
FIG. 1 ( PRIOR ART )
FIG. 1 is a generalized graph of parison skin temperature (and/or mold surface temperature) as a function of time for two blow-molding operations of the prior art for a typical resin (BEXLOY C-803, an amorphous nylon available from E. I. du Pont de Nemours and Company, Inc., Wilmington, DE 19898).

FIG. 1 shows parison skin temperature in degrees Fahrenheit plotted against time after mold closing for an engineering thermoplastic material having the structural properties needed for fabrication of an automotive panel. Two processes are illustrated. The resin used for this example of a blow molding cycle of the prior art is BEXLOY C-803, an amorphous nylon available from E. I. du Pont de Nemours and Company, Wilmington, DE 19898. The line labeled "I" is mold temperature for the prior art commercial process. Curve II shows parison skin temperature when expanded into the mold of Curve I. A part so molded is free from large air pockets but the entire surface is striated and can be covered with small inclusions from carbonized gel particles in the melt. Secondary operations include placing epoxy dots by hand on each pore, pit and inclusion, sanding the entire surface, and then spraying on a thick coat of primer. Curve III, shows a process which provides a Class A finish on small parts such as a flat bottle $4\times10\times\frac{1}{4}$ inches ($10.2\times25.4\times1.9$ centimeters). A tubular parison, for a large part ($15\frac{1}{4}\times59\frac{3}{4}\times3\frac{1}{4}$ inches) ($38.7\times151.8\times9.5$ cm) heated to a temperature of approximately 500 degrees Fahrenheit, well above its Tg of 320 degrees Fahrenheit is introduced into a hot mold (about 400 degrees Fahrenheit) and expanded by internal pressure. The mold is substantially at the same temperature as the parison surface. Th mold then is cooled, cooling the parison until the average temperature of the parison is below Tg. Pressure is then removed and the part demolded. This process, when used for large parts, produces some Class A areas but tends to have large trapped air pockets which tend to be over heated and result in surface discontinuities thus requiring vents in critical areas. Thermoforming of both solid and hollow sheets is also, done in a similar manner and exhibits a similar thermal history and similar problems.

Figure 2:
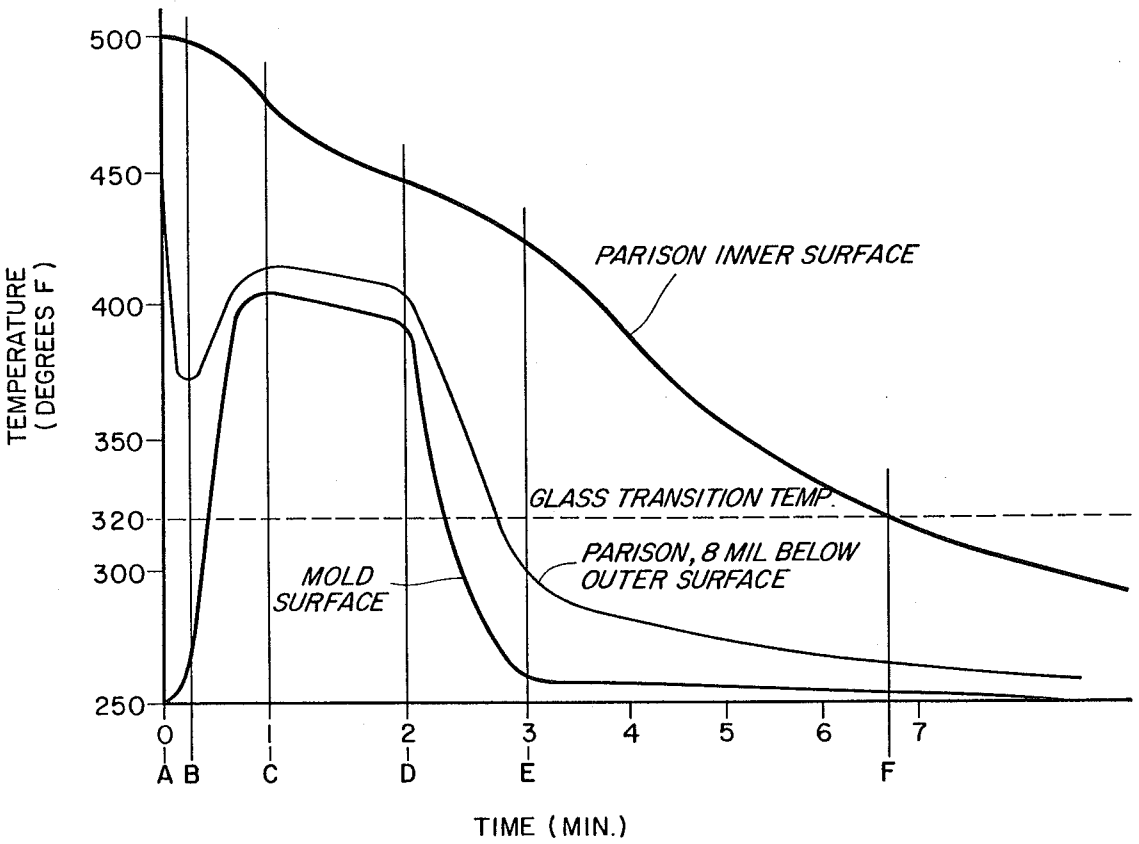
FIG. 2 is a graph of temperature as a function of time for the blow molding cycle of the instant invention showing mold/parison temperature, parison temperature 8 mils (0.008 inches or 0.203 mm) from the mold-contacting or outer surface, as well as the temperature at the inside of a tubular parison and the Tg for the same resin as FIG. 1.

FIG. 2 is a somewhat more detailed thermal history of a tubular parison fabricated from the same resin as FIG. 1 in a blow molding cycle according to the instant invention.

A tubular parison at a temperature (500 degrees Fahrenheit) well above the Tg of 320 degrees Fahrenheit is introduced into a relatively cold (250 degrees Fahrenheit) mold well below Tg (see "A" in FIG. 2) and almost instantly the skin temperature assumes the temperature of the mold surface which is below Tg. The parison is blown tho the final part shape. See "B." Mold temperature is raised rapidly until the skin of the formed part temperature is above Tg ("C"). It is held there long enough ("D") for thermal penetration to occur increasing some critical depth of material above Tg such that surface defects are eliminated. The mold and expanded formed part , still under pressure are cooled rapidly to the original mold temperature ("E"). When the average temperature of the formed part is below Tg ("F"), i.e., between "E" and "F", the pressure may be released and the part demolded. We find the contacting surface of the part has truly replicated the critical mold surface and the part has no surface defects. Small inclusions (of carbon for example) are flush with the plastic surface and sufficiently embedded to be retained during further processing. The mold is replicated. A Class A surface can be obtained that may be painted on directly. Those skilled in the art will recognize that a cleaning step between demolding and painting may be required to remove parting compounds, ambient dust, handling contamination and the like. No secondary operations such as sanding or polishing of the main surface(s) are required. Removal of flash and sanding of flash lines and vent areas, if any, may be needed.

Those skilled in the art will recognize that the cycle considered quantitatively is exemplary for the particular resin cited. We have found for this resin for example that quick elevation to above 400 degrees Fahrenheit and rapidly cooling is adequate to raise a depth of 8 mils from the skin to a slightly higher temperature. We find further that if about 8 mils is so treated, all surface defects are eliminated or mitigated and the desired surface finish attained, i.e., Class A.

One skilled in the art, armed with this teaching, will readily be able to determine these resin-dependent critical parameters for other thermoplastic resins and establish optimum conditions. This teaching, we believe stands on two legs: the relatively cold mold eliminates problems of entrapped air; the elevation of temperature of the critical surface to some small but significant depth above Tg serves to eliminate surface defects and mitigate such defects as voids, pores or inclusions by embedding or partially embedding all inclusions flush with or below the surface of the parison.

Figure 3:
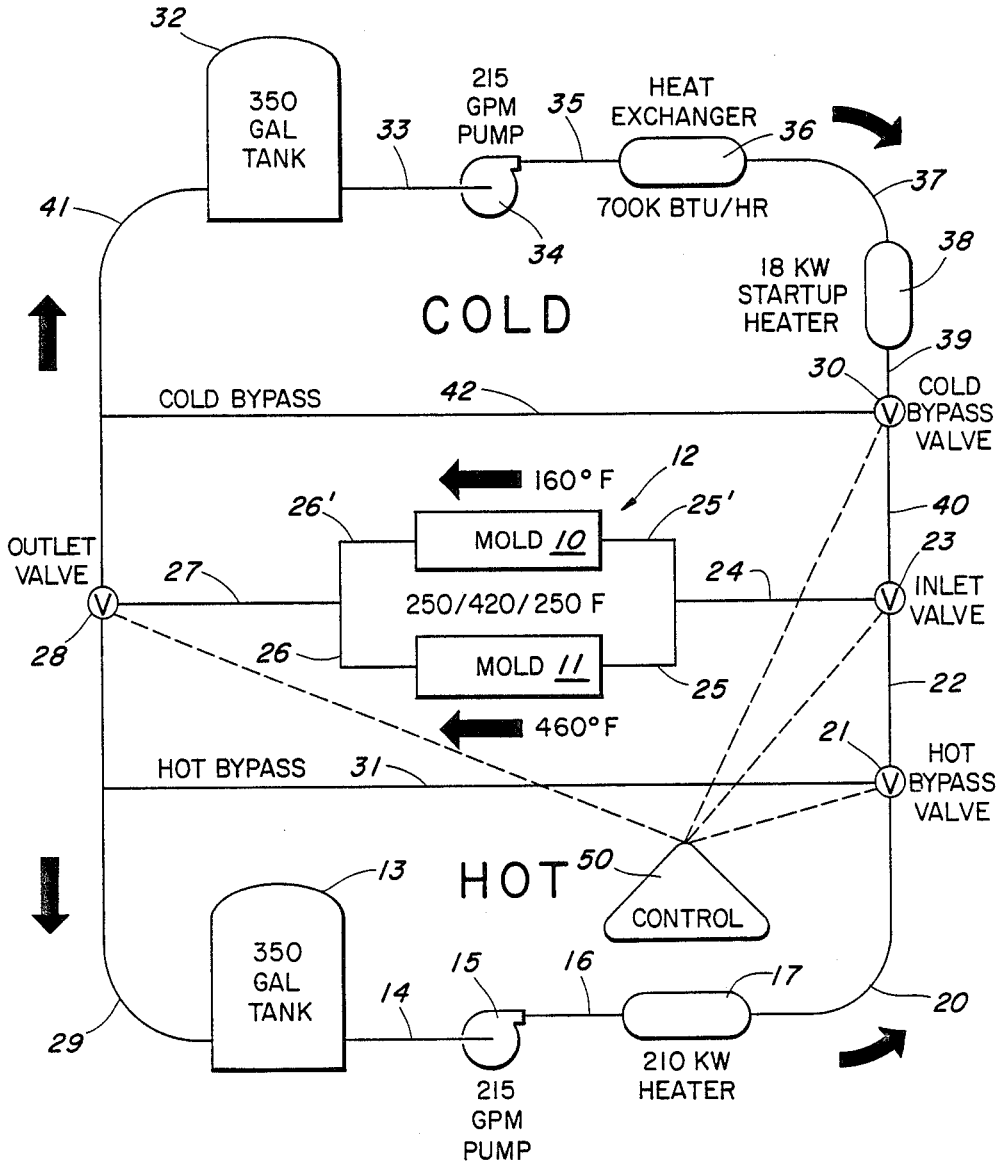
FIG. 3 is a schematic flow diagram for apparatus carrying out the molding cycle of the invention.
Figure 4:
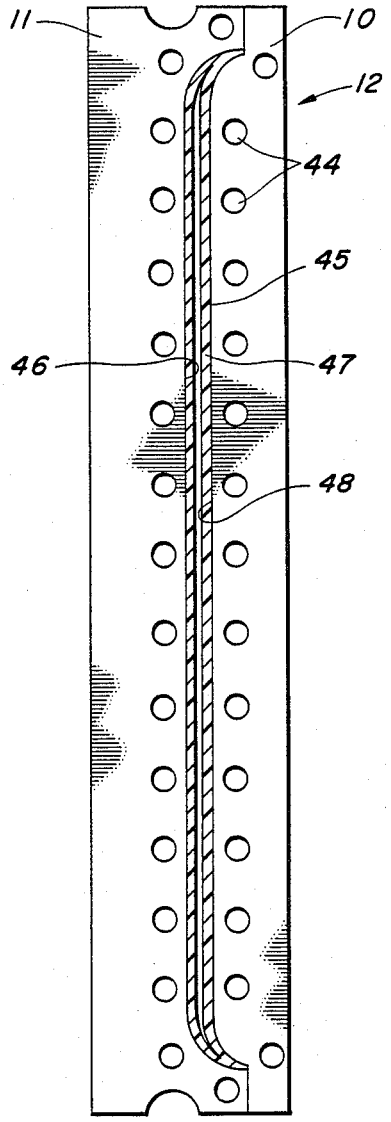
FIG. 4 is an elevational cross-section of a parison in a mold.

FIG. 3 illustrates the type of apparatus required to carry out the above process. Arrows show flow direction. Rapid mold heating and cooling must be employed to minimize molding cycle time. The apparatus of FIG. 3 is sized for producing a spoiler panel for an automobile. This panel requires a parison of BEXLOY weighing about 20 pounds (90.8 kilograms) to yield a part weighing about 9 ½ pounds (43.1 kilograms). The final shaped part fits in an envelope measuring 15.25×59.75×3.75 inches (38.7×151.8×9.5 cm). The parison, as seen in FIG. 4, is a flat elongated tube 47 closed at both ends and having one or more blow pins, not shown, communicating with the interior of the parison through the mold wall to a source of pressure. Mold pieces 10 and 11 comprise mold 12. Mold heating is provided by circulating heat exchange fluid (we employ Multitherm PG-1 available from Multitherm Corporation, Colwyn, PA) from tank 13 via pipe 14 to pump 15, and via pipe 16 to heater 17 where the temperature is raised to a level in excess of 400 degrees Fahrenheit. The appropriately heated fluid passes through two-way valve 21 to pipe 22 and through two-way valve 23 to pipe 24. The flow is then split via pipes 25, 25' to mold halves 10, 11. Exhausted fluid flows through pipes 26, 26', 27 to two-way valve 28 and returns to tank 13 by way of pipe 29.

Now consider what occurs to this hot loop when cooling is required. Two-way valves 21, 23 and 28 switch flow position (and valve 30 as will be seen). Valve 21 switches hot fluid exiting from pipe 20 to hot bypass pipe 31 which flows into pipe 29 to tank 13. Valve 23 closes pipe 22.

Simultaneously cooling begins as follows. Relatively cold heat exchange fluid from tank 32 flows consecutively through pipe 33, pump 34 and pipe 35 to heat exchanger 36 where energy is dissipated to a cooling fluid not indicated. Then fluid flows via pipe 37 to start-up heater 38. This is employed to bring the fluid up in temperature from ambient since the "relatively cold fluid" while it is below 250 degrees Fahrenheit is above ambient temperature. This heater is also used to prevent temperature drop during operation. Fluid now passes through pipe 39 and through valve 30 which is now set to pass the fluid on through pipe 40 and valve 23 now set to lead the cold fluid into pipe 24. Then, as before, the flow is via pipes 25, 25' and mold halves 10, 11 respectively, pipes 26, 26', pipe 27, and valve 28, which has switched flow exiting from pipe 27 to pipe 41 returning in pipe 41 to tank 32.

It will be recognized that on the next mold heating phase, switching the two-way valves 21, 23, 28 and 30 will initiate rapid heating while the cold fluid will continue to circulate through a loop now including cold bypass pipe 42.

By proper valve sequencing and system design it is possible to minimize cycle time. Mold 12 is held to the minimum mass consistent with structural requirements. The circulating heat exchange fluid is kept as close to a constant temperature as possible. When changing from one temperature circulating through mold 12 to the other, actuation of valve 28 is delayed for the period of time needed for the inventory of fluid in pipes 24, 25, 26 and 27 and mold halves 10, 11 to be swept out by the advancing front of the second temperature preventing substantial fluid intermixing and resultant thermal dilution. Tanks 13 and 32 are internally baffled to prevent short circuiting of flow directly from inlet to outlet. These tanks are sized so that the effect of changing mold temperature from low to high or vice-versa can be accomplished on less than the contents of the tank. Fluid brought to the correct temperature by circulation (several passes) through a bypass and stored in a tank when routed to the mold 12 can change the mold temperature as required in less than one full pass through a fluid loop. Valves are also sequenced to stagnate fluid in mold 12 for short times to precisely control temperature changes in the mold. This sequencing is done preferably with a programmable controller 50.

FIG. 4 shows greater detail of the mold 12. Mold halves 10, 11 contain interconnected flow passages 44 and in the closed position, as shown in both FIGS. 4 and 5, enclose cavity 45. Mold half 11 which is attached to a structural frame and base, not shown, is finished on face 46 to provide both an appropriate contour for the final part and a contact surface finish which, when replicated, will produce a Class A finish providing no surface aberrations occur. Preform 47 is seen located in cavity 45. It is a tubular member of thermoplastic material sealed into the shape of a bladder-like parison. It has a flow inlet and tubular conduit through the mold wall to a source of expanding pressure (we use 80 psig of compressed air). These elements are not shown. Face 48 of mold half 10 is partially finished to produce a Class A surface but the bulk of its area does not have a finely controlled finish and does not produce a Class A finish when replicated.

In operation, parison 47, preheated above Tg, is placed in cavity 45 while connected to the source of pressure not shown. Mold halves 10 and 11 connected to flow from the (relatively) cold loop of the system of FIG. 3 are closed and pressure is turned on to inflate parison 47 into contact with mold surfaces 46 and 48 and the cycle previously described is carried out.

Figure 5:
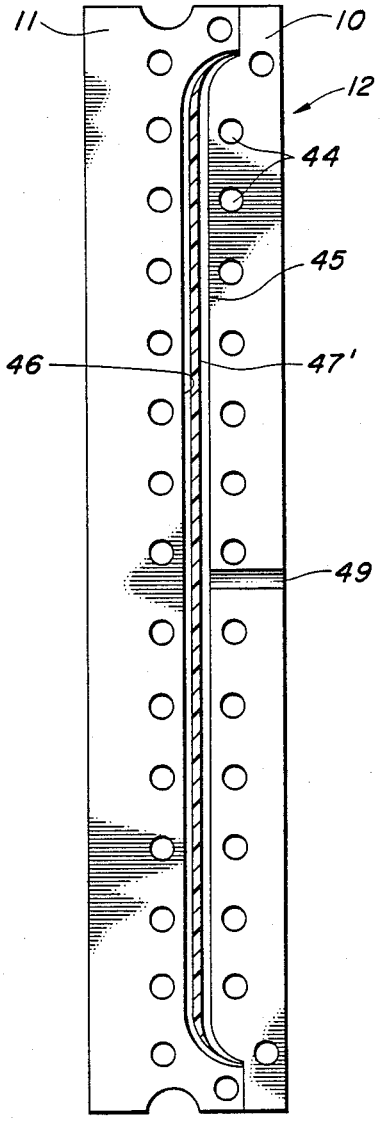
FIG. 5 is an elevational cross-section of a sheet in a mold.

FIG. 5 shows a modification of the mold of FIG. 4. It differs in that the preform 47' is a thermoformable sheet. Sheet 47', preheated to a temperature above Tg, is closed in mold 12 and pressure applied to the back side via inlet 49 to press the preform 47' against face 46. The cycle and results are as described for FIG. 4 above.

EXAMPLES

To achieve a painted Class A finish for the spoiler of the following examples, the part must exhibit a surface roughness average of 40 microinches or less before it is painted. In each of the examples, the roughness average of the mold was measured to be 8 microinches using a cutoff value of 0.030 inches, i.e., the measuring stylus responded to irregularity spacings less than 0.030 inches.

EXAMPLE 1

A parison for a spoiler (the geometry as described for FIG. 3) is extruded from BEXLOY C-803 at 500 degrees Fahrenheit (260 degrees Celsius:260° C.) and is blow molded into a 240 degrees Fahrenheit (116° C.) mold using compressed air at 80 psig and cooled to 240 degrees Fahrenheit (116° ) and demolded. The part exhibited striations (die lines), pores, and small inclusions. Roughness average measured 210 to 250 microinches with lines 0.0012 to 0.0016 inches deep.

EXAMPLE 2

A 500 degree Fahrenheit (260° C.) parison as in Example 1 was blow molded into a 250 degree Fahrenheit (121° C.) mold. The part was fully formed before the mold was heated well above 320 degrees Fahrenheit (160° C., the Tg) to 420 degrees Fahrenheit (216° C.) circulating 460 degree Fahrenheit oil (238° C.). The mold was held at 420 degrees Fahrenheit (216° C.)for 20 seconds by stopping oil circulation and then the mold and part were cooled by circulating 160 degree Fahrenheit (71° C.) oil until the part and mold reached 260 degrees Fahrenheit (127° C.) when circulation was halted. The temperature of the mold dropped to 250 degrees Fahrenheit (121° C. ) and the part was removed. The part was examined and rated Class A having a highly reflective, defect-free surface. Roughness average measured 8 microinches, replicating the mold surface.

EXAMPLE 3

A part was blow molded as in Examples 1 and 2 but into a mold at 420 degrees Fahrenheit (216° C.). The part was cooled by 160 degree Fahrenheit (71° C.) oil circulation to 260 degrees Fahrenheit (127° C.) as in Example 2. When the mold reached 250 degrees Fahrenheit (121° C.), it was opened and the part removed. Examination showed a highly reflective surface on much of the critical surface but with extensive areas exhibiting striations and with a large portion of the striated areas browned by thermal degradation due to trapped air.

EXAMPLE 4

A parison of amorphous polyarylate at 565 degrees Fahrenheit (296° C.) was blown in the mold used in previous examples initially held at 240 degrees Fahrenheit (116° C). This was raised to 425 degrees Fahrenheit (218° C.), well above the Tg of 338 degrees Fahrenheit (170° C.), and cooled as before. Cycle time was increased to 60 seconds to make this part. A good part resulted.

We claim:

1. A process for forming parts from thermoplastic materials comprising sequentially the steps of:

a. pressing at a selected pressure a preform made from thermoplastic material heated above the glass transition temperature (Tg) of the thermoplastic material with at least one face of the preform contacting a mold surface contoured to form the part and finished to impart a desired finish when replicated on the at least one face and heated to a temperature below the Tg of the thermoplastic material, b. raising the temperature of the mold surface above the Tg of the thermoplastic material for a time sufficient to heat the contacted surface of the formed part above the Tg of the thermoplastic to a depth below the contacting surface sufficient for thermal penetraton to occur which is adequate to remove surface detects and embed any inclusions in said surface, c. cooling the mold and the average temperature of the preform below the Tg of the thermoplastic material, d. releasing the presssure, and e. demolding the part, whereby the at least one fact of the part replicates the mold surface.

2. The process of claim 1 wherein the preform is a tubular parison.

3. The process of claim 1 wherein the preform is a sheet.

4. The process of claim 2 or 3 wherein the thermoplastic material is amorphous.

5. The process of claim 4 wherein the amorphous thermoplastic material is nylon.

6. The process of claim 4 wherein the amorphous thermoplastic material is polyarylate.

7. The process of claim 2 wherein the parison is pressed by expansion in a blow-molding apparatus.

8. The process of claim 3 wherein the sheet is pressed in a thermoforming apparatus.

9. A process for forming parts from thermoplastic materials comprising sequentially the steps of:

a. pressing at a selected pressure a preform made from amorphous thermoplastic material heated above the glass transition temperature (Tg) of the amorphous thermoplastic material with at least one face of the preform contacting a mold surface contoured to form the part and finisthed to impart a desired finish when replicated on the at least one face and heated to a temperature below the Tg of the amorphous thermoplastic material, b. raising the temperature of the mold surface above the Tg of the amorphous thermoplastic material for a time sufficient to heat the contacted surface of the formed part above the Tg of the amorphous thermoplastic to a depth below the contacting surface of about 8 mils whereby surface defects are removed and any inclusions therein are substantially embeded, c. cooling the mold and the average temperature of the formed part below the Tg of the amorphous thermoplastic material, d. releasing the pressure, and e. demolding the part, whereby the at least one fact of the part replicates the mold surface.

10. In a machine for the thermal formation of parts from thermoplastic materials in which pressure means act upon a thermally-softened preform of the thermoplastic material to force at least one face thereof against a mold face which is temperature-controlled by fluid circulating there through to impart contour and surface finish to the at least one face of the preform, the improvement for rapidly changing mold face temperature comprising:

a. first means for circulating relatively cold temperature-controlled fluid about a first loop bypassing the mold, b. second means for circulating relatively hot temperature controlled fluid about a second loop bypassing the mold, c. valve means for selectively directing circulating fluid from the first bypass loop to the die alternatively with directing circulating fluid from the second bypass loop, and, d. control means acting upon the valve means such that upon each alternate flow direction the fluid newly introduced from the previously bypassing loop purges from the die fluid previously passing to the die without substantial intermixing and resultant thermal dilution.

* * * * *